Oct. 13, 1964     P. POLLAK, JR., ET AL     3,152,535
MATERIAL SEPARATING APPARATUS

Filed Feb. 1, 1962                                     4 Sheets-Sheet 1

INVENTORS.
PHILIP POLLAK JR.
HERMAN L. TIEDEMANN
BY

*Arthur J. Pleantamura*
ATTORNEY.

Oct. 13, 1964   P. POLLAK, JR., ETAL   3,152,535
MATERIAL SEPARATING APPARATUS
Filed Feb. 1, 1962   4 Sheets-Sheet 2
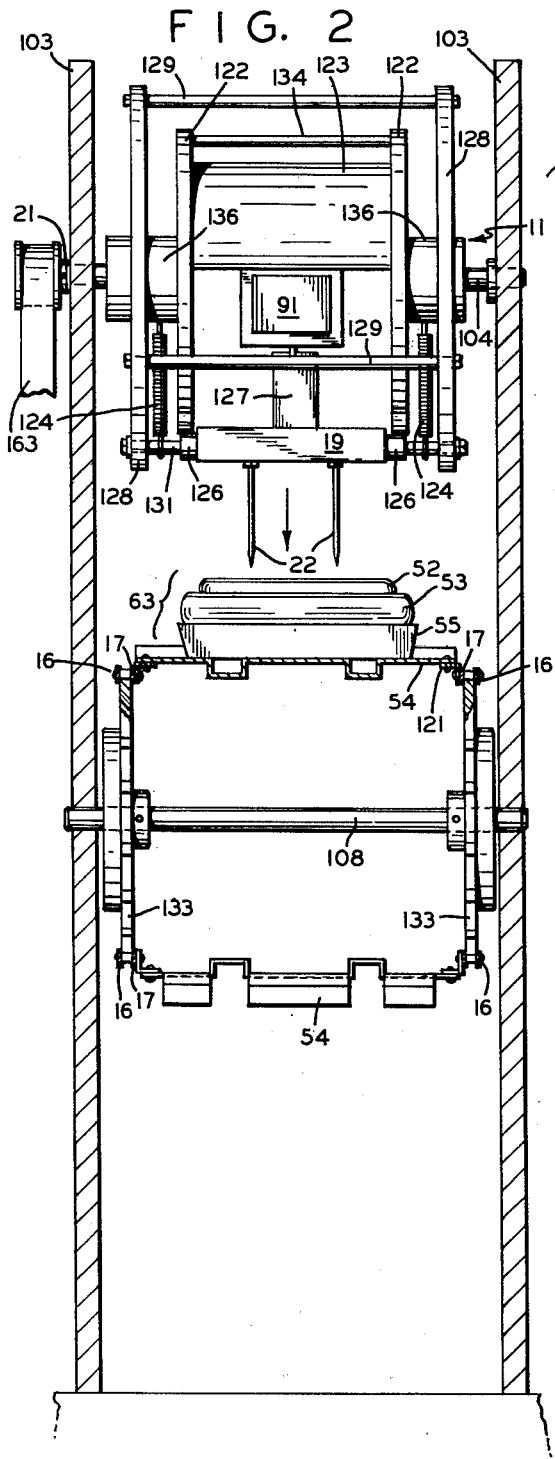
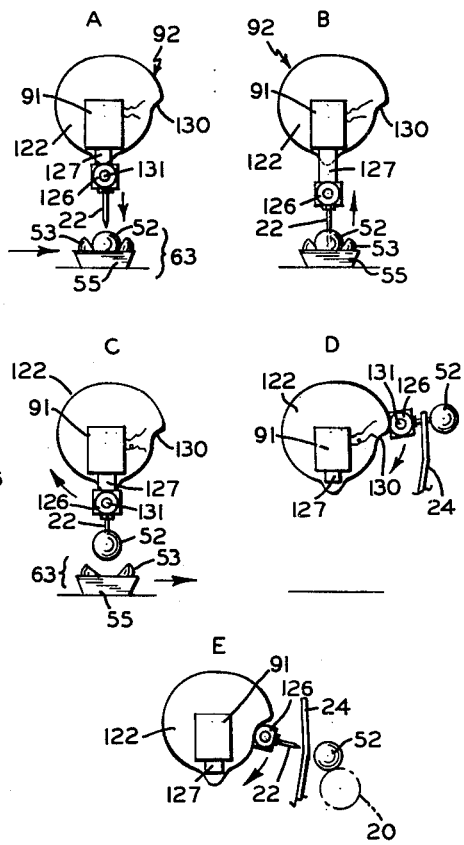
INVENTORS.
PHILIP POLLAK JR.
HERMAN L. TIEDEMANN
BY
ATTORNEY.

INVENTORS.
PHILIP POLLAK JR.
HERMAN L. TIEDEMANN

Arthur J Plantamura
ATTORNEY.

Oct. 13, 1964  P. POLLAK, JR., ETAL  3,152,535
MATERIAL SEPARATING APPARATUS
Filed Feb. 1, 1962  4 Sheets-Sheet 4
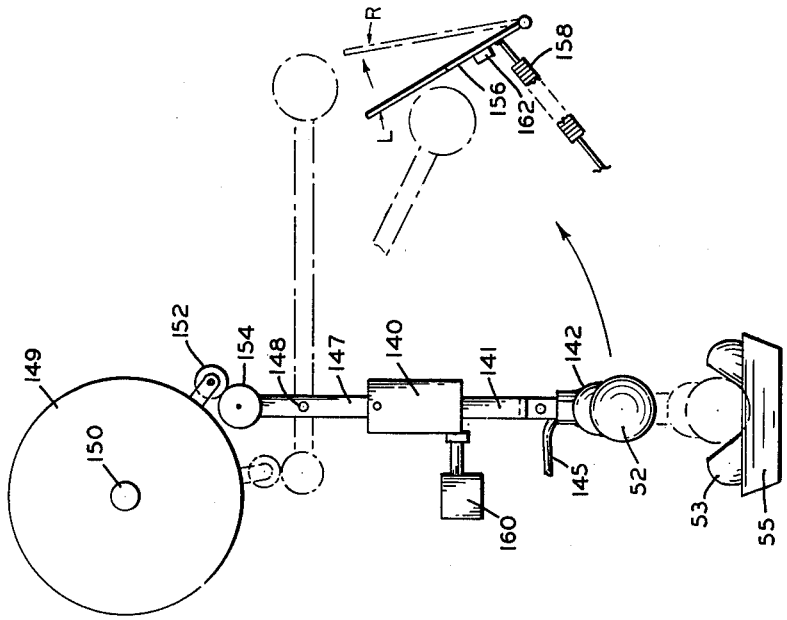
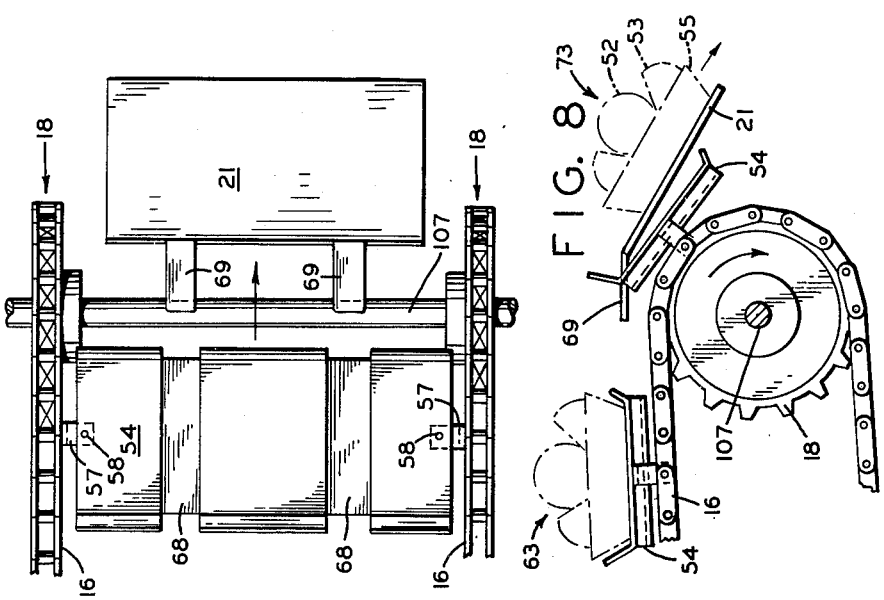
INVENTORS.
PHILIP POLLAK JR.
HERMAN L. TIEDEMANN
BY
*Arthur J. Plantamura*
ATTORNEY.

United States Patent Office 3,152,535
Patented Oct. 13, 1964

3,152,535
MATERIAL SEPARATING APPARATUS
Philip Pollak, Jr., and Herman L. Tiedemann, Stamford, Conn., assignors to American Machine & Foundry Company, a corporation of New Jersey
Filed Feb. 1, 1962, Ser. No. 170,340
7 Claims. (Cl. 99—339)

This invention relates to an apparatus for automatically processing a preassembled item comprising more than one separable component in which the apparatus separates or detaches one of the components from the item fed into the apparatus and thereafter reassembles the components of the item. In a more restricted application this invention relates to an automatic cooking and assembling machine for frankfurters, sausages and the like. More particularly, the invention is concerned with a machine for automatically cooking frankfurters or other sandwich fillers such as sausages or hamburgers which are delivered to the machine in a preassemled state; the machine then prepares the food through a sequence of operations comprising disassembling, cooking, reassembling and delivering the cooked food unit.

In studies undertaken in the automation of food servicing equipment, it has been found that the need exists for a machine capable of automatically handling, cooking and dispensing frankfurters, and like foods, assembled in a bread roll ready for the customer. The studies have further indicated that it is of definite advantage to pack and store frankfurters and similar sandwich ingredients preassembled, in a bread roll or bun, so that upon demand a whole unit in a single package may be introduced into the cooking apparatus which automatically cooks and dispenses the unit. It is highly desirable, particularly from the storage standpoint and minimal steps for assembly, to provide a machine capable of automatically disassembling and cooking preassembled units of this kind.

It is an object of the present invention to provide a novel and automatic machine for receiving a preassembled unit comprising at least two separable components and automatically disassembling and processing the components, and thereafter reassembling the components and delivering the unit in its processed assembled state.

It is a more particular object of the invention to provide a novel apparatus, fully automatic in operation, which receives a preassembled uncooked frankfurter in a bread roll, separates the frankfurter from the roll, cooks the frankfurter, optionally toasts the roll and reassembles the elements ready for delivery to a customer.

Other objects and advantages of the invention will become apparent as the following description proceeds and upon consideration thereof in conjunction with the accompanying drawings in which:

FIG. 2 is a vertical transverse view taken substantially along line 2—2 of FIG. 1.

FIG. 5 illustrates diagrammatically the operation of a preferred element for separating the frankfurter (or other element) from the assembled unit being fed into the machine and transfer thereof to the cooking conveyor.

FIG. 7 is a fragmentary plan view of the exit arrangement illustrating the exit ramp comprising fingers which pass into the carrier to separate the assembly from the carrier.

FIG. 8 is a fragmentary elevational view of the exit arrangement illustrating separation of the reassembled unit from the conveyor.

FIG. 9 illustrates an alternate arrangement which may be utilized to separate the assembled unit fed to the machine.

Figure 1:
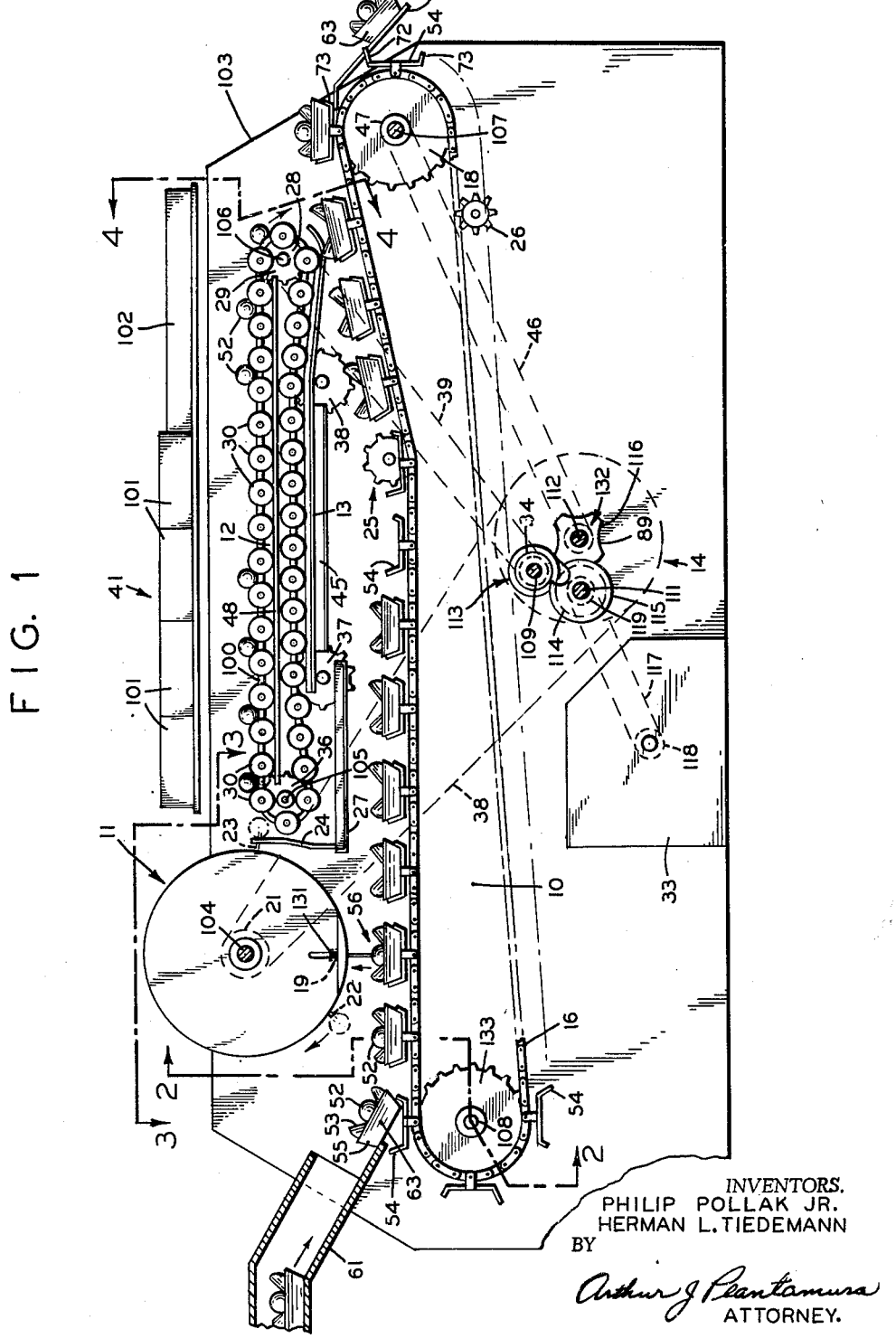
FIG. 1 is an elevational side view of the automatic frankfurter machine with various portions broken away and one supporting side plate removed to more clearly indicate the elements thereof.

Referring to the various figures and in particular at the onset to FIG. 1 the general arrangement of various elements is described as shown therein.

The mechanism comprises three main elements: the lower conveyor assembly 10; an upper second conveyor assembly 12 positioned so as to be associated in working relationship with the first conveyor assembly 10; and a separator device 11 which has the function of removing the frankfurter or other food item from a preassembled unit comprising a bread roll carried on the lower conveyor assembly 10 and delivering it to the upper conveyor assembly 12 which incorporates the cooking zone. The arrangement is enclosed or sustained by supporting side plates 103, although any suitable alternate support may be employed, and appropriately driven by a motor 33 and drive control arrangement 14.

The invention will be described hereinafter in connection with the adaptation of the machine of the invention for the preparation of frankfurters but it will be apparent that with suitable modification, obvious to those skilled in the art, the apparatus provided by the inventive concept is applicable to the preparation of other food items, as well as to any other operation not involving food which may advantageously utilize the automatic sequence of steps offered by the invention. The invention essentially provides an apparatus which is applicable to an operation in which a unit of several parts is fed into the apparatus and in which the parts are separated and subjected to distinctly different treatment before being subsequently reassembled.

Figure 3:
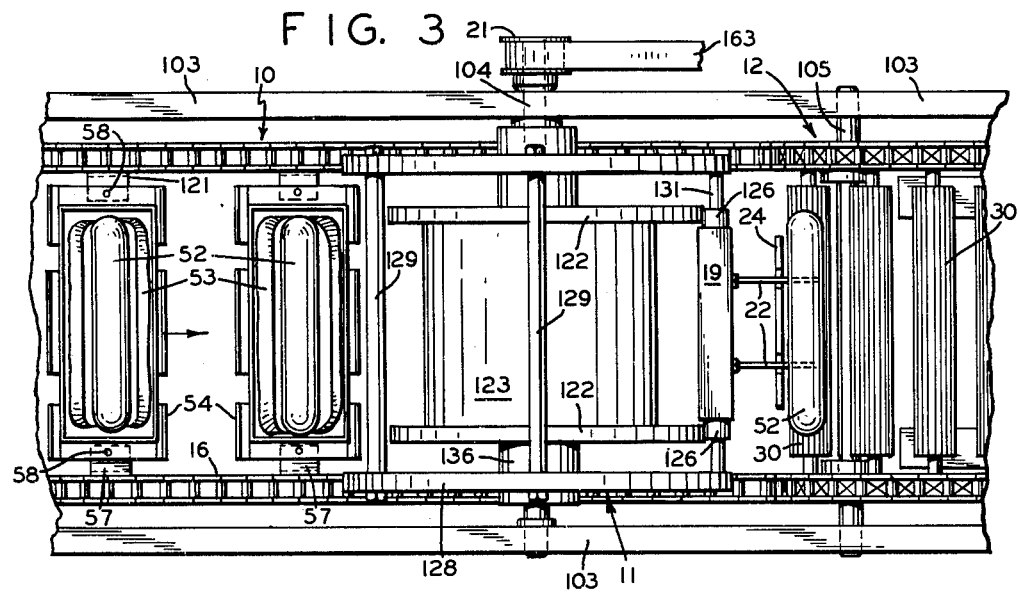
FIG. 3 is a fragmentary plan view of the machine taken substantially along line 3—3 of FIG. 1 showing the barbed wheel separator rotated clockwise 270° and a portion of the assembly at the feed or inlet end of the machine.
Figure 4:
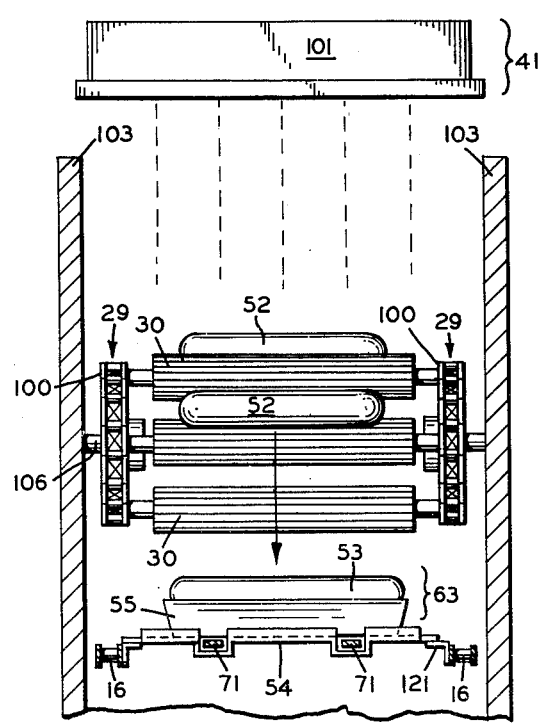
FIG. 4 is a vertical transverse view near the exit end of the machine taken substantially along line 4—4 of FIG. 1.

The lower conveyor assembly 10 comprises an endless conveyor chain 16 of conventional design and incorporates commercially available elements comprising links 17. To the links 17 of the conveyor are attached a plurality of pocket-like carriers 54, each of which is adapted to receive one of the uncooked units 63 which comprises a frankfurter 52, a bread roll 53 and a paper boat 55. The carriers 54 are suitably spaced, preferably uniformly over the entire length of the conveyor chain 16 and secured, as shown more clearly in FIG. 3, on the links 17 at 58 with clips 57. The conveyor chain 16 is supported and driven in a suitable and conventional manner through a pair of driving sprocket rollers 18 and support sprocket rollers 133 carried by shafts 107 and 108, respectively, in conjunction with conventional sets of guide rollers 25 and 26 which are arranged to mesh with the conveyor chain links 17.

Figure 6:
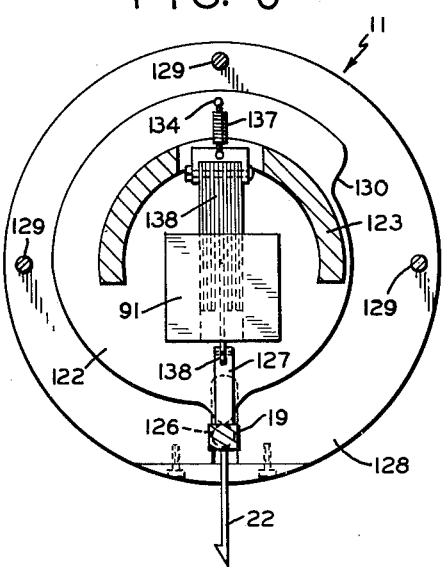
FIG. 6 is an enlarged view of the barbed wheel arrangement, illustrating in greater detail the various components thereof.

The separator device 11 interposed between the upper and lower conveyor units 12 and 10, respectively, comprises an arrangement capable of removing the frankfurter 52 from the roll 53, which is contained in a paper boat 55, and delivering it to the upper conveyor assembly 12. For this purpose, a barbed wheel assembly 11, shown in greater detail in FIGS. 2 and 6, is preferably employed, although other devices such as that described hereinafter by reference to FIG. 9 may alternately be used. The separator 11 incorporates a plurality of barbed spears 22 which are poised for piercing the frankfurter when the barb support 19 receives an impulse from the solenoid 91. The elements of the barbed wheel assembly 11 comprise the rotating element or wheels 128 which are joined by stand-off member 129 and which carry the barbs 22 on the transverse carrier 19; the stationary cams 122 positioned within the elements 128 and suitably jointed by the cam connecting frame 123 and cam stand-off member 134; and solenoid 91. The carrier 19 containing barbed spears 22 is arranged so as to be extended, when it receives an impulse from the solenoid plunger 127, to pierce the frankfurter 52 in the assembled unit 63 as it passes in proper (vertical) alignment as shown at 56 in FIG. 1. When the solenoid 19 is de-energized, the plunger 138 is withdrawn by the effect of the extended spring 137 attached thereto and to the stand-off member 134 (see FIG. 6).

The frankfurter 52, when picked up from the assembled unit 63, see diagrammatic sequence of FIG. 5, is rotated clockwise on the wheel 128 and delivered in a suitable manner to the upper conveyor assembly 12.. For the purpose of removing the frankfurter from the barbs 22, any arrangement such as the stripper plate 24, in conjunction with the camming effect of the barb carrier 19 as it is retracted when the cam follower rollers 126 pass the depression 130 on the stationary cam 122, may be used.

The conveyor assembly 12 to which the separator device 11 delivers the frankfurter, preferably comprises an endless chain arrangement 100 mounted on drive pulley shaft 106 and roller pulley shaft 105. The chain 100 carries rollers 30 mounted thereon in rotatable relationship. The rollers 30 are preferably knurled so that they rotate as well as transport the frankfurters 52 in their passage through the cooking step. It will be apparent that smooth rollers, as well as any other arrangement for transporting the frankfurter 52 and assuring substantially uniform cooking, may be utilized. As illustrated, the knurled rollers 30 are made to rotate by bearing on a serrated friction plate 48, however, any other alternate arrangement that would suitably effect the rotation of the rollers 30 may be used in lieu thereof.

The driving and support means for the upper conveyor assembly 12 comprise a pair of driven pulleys 29 and a pair of idler pulleys 36 and two pairs of guide pulleys 37 and 38. Illustrated at 13 and 27 are grease trays to catch drippings released from the frankfurter when it is cooked.

Suitably spaced above the upper conveyor assembly 12 is a heater housing 41 containing a plurality of conventional cooking elements such as reflector heat lamps 101 and quartz plate type heat lamps 102. Positioned below the upper conveyor 12 is a second heater asssembly 45 containing heating elements or lamps for the purpose of heating and optionally toasting the roll 53 when this is so desired. At the discharge end of the upper conveyor 12 is a conventional drive sprocket 28 affixed to the upper conveyor driven pulley 29. Any suitable known means may be adapted to aid in the positioning of the frankfurter 52 in the roll 53 when it is properly aligned with the roll 53 in the paper boat 55, carried by the lower conveyor 10, at the discharge end of the conveyors. In the embodiment shown, coordination of the cooked elements is effected by commercially available timing belt arrangement connected to a single drive 14 and incorporating a geneva mechanism.

The mechanism employed for driving the respective conveyors and separator comprises a standard motor 33 connected to a central drive sprocket assembly 14. The arrangement 14 comprises an input power shaft 109, a geneva input shaft 11, geneva output shaft 112 and input and output gears 113 and 114, respectively, and a geneva driver 115 and follower 116. The drive assembly 14 furnishes intermittent as well as continuous drive for the respective elements in the system. For this purpose, the geneva mechanism 89 connected by rubber composition timing belt 163 to the barbed wheel timing belt sprocket 21 furnishes intermittent movement. The continuous drive for the upper conveyor assembly 12 is effected by a belt drive sprocket 34 connected by a timing belt 39 to the upper conveyor drive sprocket 28. The driving mechanism for the lower conveyor assembly 10 comprises the driving timing belt 46 from the drive assembly 14 to the timing belt sprocket pulley 47 connected to the lower conveyor drive shaft assembly 18.

The cooked assembled unit 63 of the frankfurter 52, roll 53 and paper boat 55 is discharged in any convenient manner as by a chute 71 where upon it is delivered to the customer or wrapped for delivery. Removal of the reassembled unit 63 from the lower conveyor is effected in a manner described in conjunction with FIGS. 7 and 8 of the drawing. As the carrier 54 transports the roll over the sprocket wheel 18 (see FIG. 1), the carrier 54 engages a fixed exit ramp 21 containing prong-like extensions 69 which pass underneath the paper boat 55 and into transverse openings 68 formed in the carrier 54. As the carrier 54 follows the contour of the sprocket wheel 18, the forward end 73 of the carrier 54 is pivoted downward out of the way of the exit ramp 21. Although the paper boat 55 is now disengaged from the seat on the carrier 54, the rear end 72 of the carrier 54 continues to push the assembled unit 63 forward until it is fully positioned on the chute 71 which carries the unit from the machine.

The operation of the mechanism is as follows:

At the entrance, a frankfurter assembly 63 in the paper boat from the universal dispenser slides or is otherwise conveyed down the entrance chute 61 and is deposited in the carrier 54. Delivery of the unit 63 into the machine occurs during a dwell position of the conveyor 16 in the cycle of the drive mechanism 14. As the lower conveyor chain 16 moves, the carrier 54 transports the frankfurter assembly 63 into the machine, down a chute into the pocket of the carrier 54 which is carried by the lower conveyor 16. As the conveyor 16 carries the frankfurter 52, bread roll 53 and paper boat 55 assembly forward, it comes into a position or station 56 beneath the barbs 22 of the pick-up wheel assembly 11. At this point, the barbed spears 22 arranged so as to be rotatably carried with the wheel 128 and actuated by the solenoid 91 through the plunger 127 is extended and pierces the frankfurter 52 and lifts it free of the roll 53. The wheel 128 and the barbs 22 carrying the frankfurter through the drive mechanism is then rotated in a clockwise manner so as to come into relationship with the conveyor assembly 12. When the barbs 22 pass approximately the 2 o'clock position, the barbs 22 are withdrawn from the frankfurter 52 with the aid of a stripper plate 24 and the cam recess 130 in the stationary cam 122. The stripper plate 24 comprising a substantially flat plate with recesses (see FIG. 3) which permit passage of the barbs 22 therein, retains the frankfurter 52 and permits the withdrawal of the barbs 22 through the action of the rollers 126 in cam recess 130. The bread roll 53 in its paper boat container continues to be carried along on the lower conveyor 16. As the frankfurter 52 is placed on the left end of the upper conveyor 12, it is contained and conveyed between a pair of the knurled rollers 30. The rollers 30 are spaced on the chain 100 so as to suitably accommodate the frankfurter for rotatable transfer as it is transported through the cooking zone. Rotation of the knurled rollers 30 is effected as hereinabove noted by means of the friction plate 48 against which the rollers 30 bear, although other means may obviously be used to turn these rollers. Various means may be used, such as infrared radiation to cook the frankfurter in the cooking zone 41.

When the roll 53, from which the frankfurter 52 was removed, is transported to the right, it moves under infrared heating lamps 45 which warms and, when so desired, toasts the roll in a relatively hot and brief period after the heating. As the frankfurter 52 is guided toward the discharge end, the upper conveyor which is synchronized through timed intermittent movement, with the lower conveyor 16 through drive 14, it is dropped from the upper conveyor into the roll 53 carried by the lower conveyor. At the discharge end, the lower conveyor chain 16 carries the hot dog assembly in the paper boat 55 into the exit chute 71. The exit ramp 21 lifts the frankfurter assembly from the sheet metal carrier 54 in the manner described hereinabove.

While the invention has been described in detail illustrating the preferred embodiment, the invention is not to be construed as limited to the specific elements described. For example, in lieu of the barbed wheel assembly 11, the separation of the frankfurter from the assembled unit may suitably be effected by alternate means such as pneumatically operated suction mechanism illustrated in FIG. 9. In that arrangement, which is an alternate for the separator device 11 illustrated in FIGS. 1 and 6, a solenoid actuated suction arm is employed to lift the frankfurter from the bread roll. Referring to FIG. 9, when the frankfurter 52 is properly stationed, the solenoid 140 is energized through suitable electrical connection 144 so as to thrust the arm 141 containing suction cup 142 into engagement with the frankfurter. By means of suitable vacuum 145 applied to the cup, the frankfurter is retained and raised by the cup 142 as the solenoid is de-energized. The arm 141 through extension 147 is pivotable at 148 in a counterclockwise 90° oscillating movement. Movement is effected by means of a rotary wheel 149 mounted on shaft 150 and suitably driven. The wheel 150 carries a cam 152 which contacts a bearing element 154 secured to the arm extension 147. As the frankfurter 52 is raised so that the arm 141 is in a horizontal position, it pushes guide plate 156 from the position L to position R against the force of spring 158 as the frankfurter is elevated to release position. At the horizontal position of arm 141, the vacuum at 145 is interrupted and the frankfurter falls and is directed by means of the plate 156, which by force of the spring has now returned to the L position, onto the conveyor 100 of FIG. 1. As arm 141 reaches horizontal position, the cam 152 overrides the bearing element 154 at the upper extremity of arm 140 and the arm 141 returns to vertical position passing through a suitable aperture in plate 156. The movement of the arm 141 is checked in a vertical position by stop 160 and that of plate 156 by stop 162.

In a like manner, the conveyor assemblies 10 and 12 may be modified in any manner within the contemplation of one skilled in the art so that they are vertically disposed or inclined to effect the objective of the invention. For example, by inclining the conveyor assembly 12, the necessity of knurled roller and friction plate assembly may be obviated. Further, the synchronization of the respective elements at the exit end of the machine of the invention for the purposes of reassembling the components, in addition to the geneva driving mechanism described in conjunction with timing belts, may be effected by other arrangements within the contemplation of those skilled in the art utilizing mechanical as well as electrical apparatus or electronic devices.

Although the invention in its use for the preparation and dispensing of frankfurters has been described in conjunction with a paper boat or container, it will be apparent that the use of the container is not critical and that with suitable and minor modification of the apparatus, the unit of frankfurter and roll may appropriately be processed without the need for a receptacle or container.

The invention may readily be adopted for various applications involving processing of units having at least two components each of which it is desired to treat separately. For example, metal, wood or plastic parts may be modified in various ways, e.g. heat treated, lubricated or spray-coated with different materials or colors after the unit is fed into the apparatus and is separated, and thereafter the parts are reassembled. Specifically, for example, a toy such as a truck may be painted so that the van portion, after separation from the tractor, is painted a different color and then reassembled.

It will be apparent that various modifications, within the contemplation of one skilled in the art, may be made without departing from the inventive concept herein provided. Accordingly, the invention is not to be limited to the specific details herein described except insofar as set forth in the appended claims.

We claim:

1. An automatic frankfurter cooker which comprises a first conveyor for receiving and transferring an uncooked assembled frankfurter and bread roll unit, a plurality of carriers arranged on said first conveyor, each of which is adapted to receive one of said uncooked units, a rotary separator synchronized for operation with said conveyor elements and adapted to separate a frankfurter from an assembled unit being conveyed by said carrier, a second conveyor for receiving and transferring through a cooking zone a frankfurter delivered from said separator, said second conveyor and said separator having associated therewith means for removing a frankfurter from the separator and delivering it to said second conveyor, a frankfurter cooking zone associated with said second conveyor, means at the discharge end of said first and second conveyors for reassembling a bread roll and frankfurter carried respectively by said conveyors, and means for initiating the coordinated movements of said separator and first and second conveyors.

2. An automatic frankfurter cooker which comprises a first conveyor for receiving and transferring an uncooked assembled frankfurter and bread roll unit, a plurality of carriers arranged on said first conveyor, each of which is adapted to receive one of said uncooked units, a rotary separator synchronized for intermittent operation with said conveyor elements and adapted to separate a frankfurter from an assembled unit being conveyed by said carrier, a second conveyor comprising a plurality of frictionally rotatable knurled frankfurter supporting rollers for receiving and transferring through a cooking zone a frankfurter delivered from said separator, said second conveyor and said separator having associated therewith means for removing a frankfurter from the separator and delivering it to said second conveyor, a frankfurter cooking zone associated with said second conveyor, means at the discharge end of said first and second conveyors for reassembling a bread roll and frankfurter carried respectively by said conveyors, and means for initiating the coordinate movements of said separator and first and second conveyors.

3. The apparatus of claim 2 in which the separator to separate a frankfurter from an assembled unit comprises a solenoid actuated barb for piercing the frankfurter and a cam operable in conjunction with a stripper for disengaging the frankfurter from the barb.

4. An automatic frankfurter cooker which comprises a first conveyor for receiving and transferring an uncooked assembled frankfurter and bread roll unit, a plurality of carriers arranged on said first conveyor, each of which is adapted to receive one of said uncooked units, a rotary separator synchronized for intermittent operation with said conveyor elements and adapted to separate a frankfurter from an assembled unit being conveyed by said carrier, a second conveyor comprising a plurality of frictionally rotatable knurled frankfurter supporting rollers for receiving and transferring through a cooking zone a frankfurter delivered from said separator, said second conveyor and said separator having associated therewith means for removing a frankfurter from the separator and delivering it to said second conveyor, a frankfurter cooking zone associated with said second conveyor, a bread roll toasting means associated with said second conveyor, means at the discharge end of said first and second conveyors for reassembling a bread roll and frankfurter carried respectively by said conveyors, and means for initiating the coordinated movements of said separator and first and second conveyors.

5. An automatic sausage cooker which comprises a first conveyor for receiving and transferring an uncooked assembled sausage and bread roll unit, a plurality of slotted carriers arranged on said first lower conveyor, each of which is adapted to receive one of said uncooked units, a sausage separator synchronized with said conveyor elements and adapted to separate a sausage from an assembled unit being conveyed by said carrier, a second upper conveyor for receiving and transferring through a cooking zone a sausage delivered from said separator, said second conveyor and separator having associated therewith means for removing a sausage from the separator and delivering it to said second conveyor, a sausage cooking means associated with said second conveyor within said zone, means at the discharge end of said conveyors for reassembling a bread roll and sausage carried respectively by said first and second conveyors comprising a stationary ramp provided with fingers for lifting a reassembled cooked unit from said slotted carrier, and means for initiating the coordinated movements of said separator and first and second conveyors.

6. An automatic frankfurter cooker which comprises a first conveyor for receiving and transferring an uncooked assembled frankfurter and bread roll unit within a container, a plurality of slotted carriers arranged on said first lower conveyor, each of which is adapted to receive one of said uncooked units in the container, a frankfurter separator synchronized with said conveyor elements and adapted to separate a frankfurter from the assembled unit being conveyed by said carrier, a second upper conveyor for receiving and transferring through a cooking zone a frankfurter delivered from said separator, said second conveyor and separator having associated therewith means for removing a frankfurter from the separator and delivering it to said second conveyor, a frankfurter cooking means associated with said second conveyor within said zone, means for warming a bread roll in the container separate from the frankfurter on the first conveyor, means at the discharge end of said conveyors for reassembling a bread roll in the container and the frankfurter carried respectively by said first and second conveyors, and means for initiating the coordinated movements of said separator and first and second conveyors.

7. An automatic frankfurter cooker which comprises a first conveyor for receiving and transferring an uncooked assembled frankfurter and bread roll unit within ia paper container, a plurality of slotted carriers arranged on said first lower conveyor, each of which is adapted to receive one of said uncooked units in the paper container, a frankfurter separator synchronized with said conveyor elements and adapted to separate a frankfurter from the assembled unit being conveyed by said carrier, a second upper conveyor for receiving and transferring through a cooking zone a frankfurter delivered from said separator, said second conveyor and separator having associated therewith means for removing a frankfurter from the separator and delivering it to said second conveyor, a frankfurter cooking means associated with said second conveyor within said zone, means for warming and toasting a bread roll in the paper container separate from the frankfurter on the first conveyor, means at the discharge end of said conveyors for reassembling a bread roll in the paper container and the frankfurter carried respectively by said first and second conveyors, and means for initiating the coordinated movements of said separator and first and second conveyors.

References Cited in the file of this patent

UNITED STATES PATENTS

| | | |
|---|---|---|
| 1,348,341 | Winkley | Aug. 3, 1920 |
| 2,244,670 | Benedict | June 10, 1941 |
| 2,575,426 | Parnell | Nov. 20, 1951 |
| 2,602,392 | Panken | July 8, 1952 |
| 2,700,939 | Liston | Feb. 1, 1955 |
| 2,745,452 | Hawkins | May 15, 1956 |
| 2,788,735 | Farace | Apr. 16, 1957 |
| 2,799,029 | Schram | July 16, 1957 |
| 2,930,312 | Richman et al. | Mar. 29, 1960 |